United States Patent
Lee et al.

(10) Patent No.: US 8,795,826 B2
(45) Date of Patent: Aug. 5, 2014

(54) MICROPOROUS POLYOLEFIN COMPOSITE FILM WITH A THERMALLY STABLE POROUS LAYER AT HIGH TEMPERATURE

(75) Inventors: Jean Lee, Daejeon (KR); Jongmoon Sung, Daejeon (KR); Cholho Lee, Daejeon (KR); Yongkyoung Kim, Daejeon (KR); Youngkeun Lee, Seoul (KR)

(73) Assignee: SK Innovation Co., Ltd., Seoul (KR)

( * ) Notice: Subject to any disclaimer, the term of this patent is extended or adjusted under 35 U.S.C. 154(b) by 615 days.

(21) Appl. No.: 12/936,416

(22) PCT Filed: Apr. 8, 2009

(86) PCT No.: PCT/KR2009/001826
§ 371 (c)(1),
(2), (4) Date: Oct. 5, 2010

(87) PCT Pub. No.: WO2009/125984
PCT Pub. Date: Oct. 15, 2009

(65) Prior Publication Data
US 2011/0027642 A1 Feb. 3, 2011

(30) Foreign Application Priority Data
Apr. 8, 2008 (KR) .................. 10-2008-0032886
Apr. 8, 2009 (KR) .................. 10-2009-0030355

(51) Int. Cl.
*B32B 5/22* (2006.01)

(52) U.S. Cl.
USPC .............. 428/316.6; 428/317.9; 428/315.5; 428/315.7; 428/315.9; 429/145

(58) Field of Classification Search
USPC .......... 428/315.5, 315.7, 315.9, 317.9, 316.6; 429/145
See application file for complete search history.

(56) References Cited

U.S. PATENT DOCUMENTS

| | | | |
|---|---|---|---|
| 5,641,565 A | 6/1997 | Sogo | |
| 5,691,077 A | 11/1997 | Yu | |
| 6,127,438 A | 10/2000 | Hasegawa et al. | |
| 6,562,519 B2 | 5/2003 | Yamamoto et al. | |
| 6,949,315 B1 | 9/2005 | Samii et al. | |
| 2008/0070107 A1* | 3/2008 | Kasamatsu et al. | 429/144 |
| 2009/0098450 A1* | 4/2009 | Kikuchi et al. | 429/145 |
| 2012/0077113 A1* | 3/2012 | Kim et al. | 429/516 |

FOREIGN PATENT DOCUMENTS

| | | |
|---|---|---|
| JP | 2002-321323 | 11/2002 |
| JP | 2002-355938 | 12/2002 |
| JP | 2004-161899 | 6/2004 |
| JP | 2006-059733 | 3/2006 |
| JP | 3797729 | 4/2006 |

(Continued)

*Primary Examiner* — Hai Vo
(74) *Attorney, Agent, or Firm* — Clark & Brody (57) ABSTRACT

Provided is a microporous polyolefin composite film with a thermally stable porous layer at high temperature, particularly, to the microporous polyolefin composite film in which the thermally stable porous layer at high temperature, which contains organic or inorganic particles and heat-resistant polymer having aromatic ring in main chain and also having a melting temperature or a glass transition temperature of 170 to 500° C., is formed on one surface or both surfaces of a polyolefin microporous film by a phase separation, wherein the composite film with the porous layer has a permeability of $1.5 \times 10^{-5}$ to $20.0 \times 10^{-5}$ Darcy, a meltdown temperature of 160 to 300° C., a MD/TD shrinkage of 1 to 40% at a temperature of 150° C. for 60 minutes.

6 Claims, 3 Drawing Sheets

(56) References Cited

FOREIGN PATENT DOCUMENTS

| | | |
|---|---|---|
| JP | 2007-324073 | 12/2007 |
| KR | 10-1999-0083447 | 11/1999 |
| KR | 10-2002-0071203 | 9/2002 |
| KR | 10-2006-0042119 | 5/2006 |
| KR | 10-2007-0080245 | 8/2007 |
| WO | 2005/049318 | 6/2005 |

* cited by examiner

MICROPOROUS POLYOLEFIN COMPOSITE FILM WITH A THERMALLY STABLE POROUS LAYER AT HIGH TEMPERATURE

TECHNICAL FIELD

The present invention relates to a microporous polyolefin composite film having excellent permeability and also excellent thermal stability in high temperature electrolytes, and more particularly, to a microporous polyolefin composite film with a thermally stable porous layer at high temperature, which is used as a separator for a high-capacity/high-power lithium secondary battery.

BACKGROUND ART

A polyolefin-based microporous film has been widely used as a battery separator, a separator filter, and a membrane for microfiltration, due to its chemical stability and excellent physical properties. Meanwhile, for the battery separator, the microporous structure is required to have a spatial separation function between positive and negative electrodes and a microporous structure for high ionic conductivity. Recently, it has been further required to enhance the characteristic of the separator for the thermal stability and electrical stability upon charging and discharging of the secondary battery, according to the tendency of the secondary battery toward the high-capacity and high-power. In case of the lithium secondary battery, if the thermal stability of the separator is deteriorated, the separator may be damaged or deformed by increase of temperature in the battery and thus an electrical short may occur between the electrodes. Therefore, there is a risk that the battery may be overheated or ignited. The thermal stability of the battery is affected by shutdown temperature, meltdown temperature, high temperature melt shrinkage and the like.

The separator having the excellent thermal stability at high temperature is prevented from being damaged at the high temperature, thereby preventing the electrical short between the electrodes. If the electrical short occurs between the electrodes due to dendrite generated during charging and discharging processes of the battery, the battery generates heat. At this time, in case of the separator having the excellent thermal stability at high temperature, it is prevented that the separator is damaged and thus the battery is ignited or exploded.

In order to increase the thermal stability of the separator, there have been proposed a method that crosslinks the separator, a method that adds inorganic matterparticles, and a method that mixes a heat-resistant resin with a polyolefin resin or forms a coating layer.

The crosslinking method of the separator is disclosed in U.S. Pat. Nos. 6,127,438 and 6,562,519. In these methods, a film is treated by electron beam crosslinking or chemical crosslinking. However, in case of the electron beam crosslinking, there are some disadvantages such as necessity for an electron beam crosslinking apparatus, a limitation of production speed, a variation in quality according to non-uniform crosslinking. And in case of the chemical crosslinking, there are also some disadvantages in that it has complicated extruding and mixing processes, and a gel may be generated at a film due to the non-uniform crosslinking.

Meanwhile, in U.S. Pat. No. 6,949,315, there is disclosed a method of enhancing the thermal stability of the separator by mixing an ultra high molecular weight polyethylene with inorganic particles like titanium oxide of 5 to 15 weight %. However, in this method, there are some disadvantages such as increase of extruding load, deterioration of the extruding and melt-kneading ability, and occurrence of incomplete stretching due to using of the ultra high molecular weight polyethylene, as well as inferiority in the mixing, variation in quality and generation of pinholes due to using of inorganic particles. Further, physical properties of the film are also deteriorated due to lack of interface compatibility between the inorganic particles and the high molecular resin.

In U.S. Pat. No. 5,641,565, there is disclosed a method in which an excellent heat-resistant resin is melt-kneaded. In this method, an ultra high molecular weight resin having an average molecular weight of 1,000,000 or more is needed to prevent deterioration of the physical properties due to adding of polyethylene, polypropylene and inorganic particles. Further, since an additional is also needed to separate and remove the used inorganic materials particles, the manufacturing process is very complicated.

In Japanese Patent Publication No. 2004-161899, there is disclosed a microporous film which contains polyethylene and non-polyethylene thermoplastic resin having excellent heat-resistance and being not completely melted but minutely dispersed when being mixing with the polyethylene. However, there is a disadvantage that the microporous film manufactured by this method has a non-uniform thickness due to particulate heat-resistant resin. If the microporous film has the non-uniform thickness, the defective proportion in assembling of battery is increased and thus the productivity is reduced. Also, after the assembling of battery, an electrical short occurs, thereby deteriorating safety.

In U.S. Pat. No. 5,691,077 and Japanese Patent Publication No. 2002-321323, there are disclosed methods of forming additionally heat resistant layer on a polyolefin-based microporous film. In these methods, a polypropylene layer is provided by a dry or wet process, but a heat-resistant layer is stretched and it is difficult to basically prevent heat shrinkage due to limitation of a melting point of polypropylene. Therefore, there is limitation in manufacturing of a high heat-resistant separator. Further, in Korean Patent Publication No. 2007-0080245 and International Publication No. WO2005/049318, polyvinyldene fluoride copolymer that is a heat-resistant resin is used as a coating layer so as to enhance the heat-resistance of the separator and the thermal stability of the battery. However, since the resin is easily dissolved or gelled in an organic solvent such as propylene carbonate, ethylene carbonate, diethyl carbonate, dimethyl carbonate, and ethyl methyl carbonate, which is used as a non-aqueous electrolyte of a battery, there is limitation in enhancing the thermal stability of the battery.

In Japanese Patent Publication No. 2002-355938, there is disclosed a microporous polyolefin composite film in which a high heat-resistant resin is used. In this film, the high heat-resistant resin is applied to a polyolefin microporous film by the phase separation. However, it is difficult to provide efficient permeability by a pore forming method in which a single resin is phase-separated by a dry process when forming a coating layer of the film. Further, since phase separation size and uniformity are considerably changed according to the drying conditions such as humidity, temperature and so on, there is limitation in manufacturing the separator having uniform quality.

With respect to the heat-resistance as one of the main characteristics of the battery separator, the conventional methods have a limitation in the heat-resistance of the resin itself, or the applying of the heat-resistant resin does not contribute to the improvement of the heat-resistance of the separator. And other physical properties like gas permeability are low or do not mentioned, and also the quality uniformity is poor. Further, when the separator manufacture by the conventional methods are actually applied to the battery, there is a problem that it is not provide constant thermal stability under the conditions such as high temperature, high voltage and organic electrolytes.

DISCLOSURE OF INVENTION

Technical Problem

An object of the present invention is to provide a microporous polyolefin composite film with a thermally stable porous layer at high temperature, which has excellent permeability and also excellent thermal stability in high temperature electrolytes, and more particularly, to provide a separator which is proper to high power/high capacity of a battery.

Technical Solution

To achieve the above objects, the present invention provides a microporous polyolefin composite film in which a thermally stable porous layer at high temperature, which contains organic or inorganic particles and heat-resistant polymer having aromatic ring in main chain and also having a melting temperature or a glass transition temperature of 170 to 500° C., is formed on one surface or both surfaces of a polyolefin microporous film by a phase separation, wherein the composite film with the porous layer has a permeability of $1.5 \times 10^{-5}$ to $20.0 \times 10^{-5}$ Darcy, a meltdown temperature of 160 to 300° C., a machine direction (MD) and a transverse direction (TD) shrinkage of 1 to 40% at a temperature of 150° C. for 60 minutes.

Further, the present invention provides a method of manufacturing the thermally stable porous layer at high temperature, including (1) preparing a mixed solution by mixing organic or inorganic particles and a nonsolvent of heat-resistant polymer with a solution in which the heat-resistant polymer is dissolved in a solvent; (2) coating the mixed solution on one surface or both surfaces of a polyolefin microporous film; (3) forming the thermally stable porous layer by drying and phase-separating the coated polyolefin microporous film; and (4) removing the solvent and nonsolvent remained in the thermally stable porous layer by drying or extracting.

Further, the present invention provides a separator for a lithium secondary battery, which contains a the microporous polyolefin composite film with the thermally stable porous layer at high temperature.

Further, the present invention provides a lithium secondary battery having the separator.

Hereinafter, the present invention will be described more fully.

In the microporous polyolefin composite film of the present invention, a thermally stable porous layer at high temperature, which contains heat-resistant polymer having aromatic ring in main chain and also having a melting temperature or a glass transition temperature of 170 to 500° C. and organic or inorganic particles having a size of 0.01 to 2 μm, is formed on one surface or both surfaces of a polyolefin microporous film by a phase separation, wherein the entire composite film including the layer has a permeability of $1.5 \times 10^{-5}$ to $20.0 \times 10^{-5}$ Darcy, a meltdown temperature of 160 to 300° C., a MD/TD shrinkage of 1 to 40% at a temperature of 150° C. for 60 minutes. Preferably, in order to provide such physical properties, an entire thickness of the coating layer is 0.1 to 1.0 times that of the polyolefin microporous film, and a bonding force between the coating layer and the polyolefin microporous film is 0.1 to 1.0 kgf/cm.

It is preferable that the polymer in the coating layer has a melting temperature or a glass transition temperature of 170 to 500° C. If the melting temperature is less than 170° C., it is not possible to secure the thermal stability enough to endure a rapid rise in temperature by internal short of the battery, and if the melting temperature is more than 500° C., too much energy is consumed when melting the polymer and the thermal stability at high temperature is no longer enhanced. Preferably, the polymer contains aromatic ring in main chain. In this case, since the melting temperature or the glass transition temperature is increased due to increase in rigidity of the polymer chain, the heat resistance is increased. Further, due to the hydrophobicity of the aromatic ring, the polymer is not easily dissolved or gelled in the organic electrolytes such as propylene carbonate, ethylene carbonate, diethyl carbonate, dimethyl carbonate, and ethyl methyl carbonate. and the coating layer is stably maintained at high voltage and high temperature when applied to the battery.

According to the present invention, the organic or inorganic particles having a size of 0.01 to 2 μm is contained together with the heat-resistant polymer. Various organic or inorganic particles can be selected according to various purposes of increase in a impregnation rate of a liquid electrolyte with respect to a separator, increase in physical strength of the coating layer, increase in a porosity of the coating layer, increase in heat resistance of the separator, and prevention of an electrical short by securing a space between electrodes upon an abnormal condition of the battery. The organic or inorganic particles is used for these purposes independently or combined. The particle size is 0.01 to 2 μm, more preferably, 0.05 to 1 μm. If the particle size is less than 0.01 μm, the particles may close up pores in the surface of the polyolefin microporous film and thus the permeability may be deteriorated, or otherwise the particles may be buried in the polymer after the phase separation and thus characteristic of the particles may be not expressed. On the other hand, if the particle size is more than 2 μm, a final separator may have a non-uniform thickness, and it is difficult to secure the bonding force with the polyolefin microporous film, and also since the efficiency is lowered due to reduction of a surface area, there is difficulty in dispersion.

The contained organic particles include one or more of polyvinyldene fluoride (PVdF), polytetrafluoroethylene (PTFE), polyurethane, polymethylpentene (PMP), polyethylene terephthalate (PET), polycarbonate (PC), polyester, polyvinyl alcohol (PVA), polyacrylonitrile (PAN), polymethylene oxide (PMO), polymethyl methacrylate (PMMA), polyethylene oxide (PEO), cellulose and so on, and the inorganic particles include one or more of an oxide, a hydroxide, a sulfide, a nitride, a carbide and the like of at least one of metallic or semiconductor elements such as Si, Al, Ca, Ti, B, Sn, Mg, Li, Co, Ni, Sr, Ce, Zr, Y, Pb, Zn, Ba. Further, alone or a mixture of the organic and inorganic particles may be used.

Meanwhile, in case that the polymer of the coating layer does not form a porous structure or closes up the pores of the polyolefin microporous film during the coating process, the gas and ion permeability is deteriorated, and thus electric characteristics of the battery such as high-rate characteristic, charging and discharging characteristic, low-temperature characteristic and cyclability are lowered. At this time, the gas permeability is $1.5 \times 10^{-5}$ to $20.0 \times 10^{-5}$ Darcy, preferably, $2.0 \times 10^{-5}$ to $10.0 \times 10^{-5}$ Darcy. If the gas permeability is less than $1.5 \times 10^{-5}$ Darcy, the ion permeability is lowered, and thus the electric characteristics are deteriorated, and if the gas permeability is more than $20.0 \times 10^{-5}$ Darcy, the gas permeability is too high, and thus safety of the battery is lowered. It is preferable that the entire thickness of the polymer coating layer is 0.1 to 1.0 times, more preferably, 0.2 to 0.6 times that of the polyolefin microporous film. If the entire thickness of the polymer coating layer is less than 0.1 times, it is not possible to prevent the heat shrinkage and fracture at high temperature, and if entire thickness of the polymer coating layer is more than 1.0 times, strength of the entire microporous film may be lowered due to lower strength of the coating layer than the stretched polyolefin microporous film, and this may result in deterioration of stability of the battery. Further, if a pore size of the coating layer having a thick thickness is not properly controlled, it may exert a bad influence on power and long-term performance of the battery.

In order to enhance the thermal stability of the lithium secondary battery, it is preferable that the separator has high meltdown temperature. In the present invention, the separator has a meltdown temperature of 160 to 300° C. The meltdown temperature is affected by thermal property of a separator material and stability in the organic electrolyte. The polyethylene microporous film has a meltdown temperature of 150° C. or less due to a limitation of a melting point thereof. Even in case of a separator containing a high heat-resistant fluorine resin having a melting temperature of a glass transition temperature of 170 to 500° C. or a highly crystalline resin having a strong hydrogen bond, it is difficult that the meltdown temperature is increased to 160° C. or more when dissolved or gelled in the organic electrolytes. Since the coating layer contains aromatic ring in main chain, the microporous polyolefin composite film of the present invention has excellent thermal property, and since the microporous polyolefin composite film is stable with respect to the organic electrolytes due to the hydrophobicity of the aromatic ring having hydrocarbon group, it has a high meltdown temperature. Therefore, if a polymer containing aromatic chain having a melting temperature of a glass transition temperature of 170° C. or more is coated on the polyolefin microporous film, the meltdown temperature is increased to 160° C. or more. Therefore, if the meltdown temperature of the composite film is 160° C. or less, the thermal property of the composite film is deteriorated, and if the meltdown temperature is 300° C. or more, the efficiency is no longer improved corresponding to the rise in temperature.

The MD/TD shrinkage is 1 to 40%, preferably, 2 to 30% at a temperature of 150° C. for 60 minutes. Like in the meltdown temperature, the MD/TD shrinkage at a temperature of 150° C. shows the high temperature stability of the separator. If the shrinkage is less than 1%, as internal temperature of the battery is increased, the heat shrinkage occurs. Thus, the two electrodes are exposed and an electrical short occurs between the electrodes, and fire and explosion occur. If the shrinkage rate is more than 40%, the physical properties are deteriorated due to the excessive heat shrinkage. The MD/TD shrinkage is affected by the thermal property of the separator material and an orientation degree of the resin. The polymer layer of the present invention is characterized by an excellent shrinkage at high temperature since a coating material has high thermal property and the polymer of the coating layer has a low orientation degree. In order to obtain the above shrinkage, it is preferable that a bonding force between the coating layer and the polyolefin microporous film is 0.1 to 1.0 kgf/cm. Although the coating layer has the excellent heat resistance and shrinkage at high temperature, if the bonding force is less than 0.1 kgf/cm, it is not possible to prevent the shrinkage of the polyolefin microporous film, and a risk of the electrical short in the battery is increased. If the bonding force is more than 1.0 kgf/cm, the increased bonding force is not led to an effect of reducing the shrinkage.

Further, to achieve the above objects, a method of manufacturing the microporous polyolefin composite film according to the present invention may include the following processes.

The method of manufacturing the microporous polyolefin composite film according to the present invention includes:

(A) preparing a polyolefin microporous film using a composition containing a polyolefin resin;

(B) coating a solution, in which a high heat-resistant resin is dissolved, on one surface or both surfaces of the polyolefin microporous film;

(C) phase-separating a composition contained in a coating layer so as to form the coating layer having pores after the coating; and (D) drying the porous coating layer so as to remove components except the composition of the coating layer.

Speaking more detailedly, it is preferable that the polyolefin microporous film is a single layer type or two or more laminated layers type formed of polyethylene, polypropylene, polybutylene, and a copolymer thereof or a copolymer in which alphaolefin comonomer having a carbon number of 5 to 8 is contained in the polyolefin, and a mixture thereof. The materials are not specially limited, but it is preferable to contain high density polyethylene and polypropylene for the purposes of facility of manufacturing the separator, high strength, proper shutdown temperature or meltdown temperature.

The proper shutdown temperature is 120 to 140° C. If the shutdown temperature is less than 120° C., the pores of the separator may be closed even by a relatively small temperature rise, and the battery is failed. If the shutdown temperature is more than 140° C., it is not possible to prevent the ignition and explosion generated by boiling or decomposing of the organic electrolytes. It is preferable that the meltdown temperature is 140 to 200° C. If the meltdown temperature is less than 140° C., a temperature section, in which the pores are closed, is short when battery temperature is increased, and thus it is not possible to efficiently prevent the abnormal behavior of the battery, and if the meltdown temperature is more than 200° C., the efficiency is not improved corresponding to the increased temperature.

If necessary, some additives for particular purposes, such as antioxidant, UV stabilizer, and antistatic agent, may be added to the composition within a range that the characteristics of the separator are not deteriorated remarkably.

The polyolefin microporous film may contain organic or inorganic particles for the purposes of formation of the pores, enhancement of the heat resistance and impregnation of the organic electrolyte and the like.

The organic or inorganic particles have a size of 0.01 to 2 μm. Preferably, the particle size is 0.01 to 2 μm, more preferably, 0.05 to 1 μm. If the particle size is less than 0.01 μm, the particles may close up the pores formed in the surface of the polyolefin microporous film and the permeability is lowered, and also since the particles are buried in the polymer after the phase separation and thus the characteristic of the particles may be not expressed. Meanwhile, if the particle size is more than 2 μm, a final separator may have a non-uniform thickness, and it is difficult to secure the bonding force with the polyolefin microporous film, and also since the efficiency is lowered due to reduction of a surface area, there is difficulty in dispersion.

The organic particles include one or more of polyvinyldene fluoride (PVdF), polytetrafluoroethylene (PTFE), polyurethane, polymethylpentene (PMP), polyethylene terephthalate (PET), polycarbonate (PC), polyester, polyvinyl alcohol (PVA), polyacrylonitrile (PAN), polymethylene oxide (PMO), polymethyl methacrylate (PMMA), polyethylene oxide (PEO), cellulose and so on, and the inorganic particles include one or more of an oxide, a hydroxide, a sulfide, a nitride, a carbide and the like of at least one of metallic or semiconductor elements such as Si, Al, Ca, Ti, B, Sn, Mg, Li, Co, Ni, Sr, Ce, Zr, Y, Pb, Zn, Ba. Further, Alone or a mixture of the organic and inorganic particles as well as the organic particles and the inorganic particles may be used.

There is not limitation in the method of manufacturing the polyolefin microporous film, but it is preferable to include one or more following processes:

(a) a process of melting and mixing a polyolefin resin in diluent, which, can be mixed with polyolefin resin at high temperature, so as to form a sheet, and stretching the sheet after phase-separating so as to form a film, and extracting the organic solvent by using a volatile solvent, and then drying and heat-setting the film.

(b) a process of melting a polyolefin resin so as to form a sheet, and stretching the sheet at low or high temperature so as to exfoliate an interface between crystals and form film and pores, and then heat-setting the film.

(c) a process of mixing organic or inorganic particles having a higher melting temperature than the polyolefin resin and stretching a sheet so as to exfoliate an interface between the resin and the particle and form film and pores, and extracting the particles or heat-setting the film in a state of containing the particles.

In order to enhance the heat resistance and strength of the polyolefin microporous film and also enhance the stability in the organic electrolytes, a process of mixing monomer or oligomer having an unsaturated bonding group, and polymerizing and chemically cross-linking the mixture by using heat energy or ionizing radiation, or cross-linking the polyolefin alone or together with an initiator by using the ionizing radiation and the like may be included. The cross-linking can be carried out at any time, e.g., after forming the sheet, before and after the stretching, before and after the extracting, and before and after the heat-setting, within a range that the basic physical properties of the polyolefin are not deteriorated.

Before forming the coating layer on the polyolefin microporous film, a process of graft polymerizing polar monomer, oligomer or polymer by using the ionizing radiation so as to reform a surface of the film, or a process of plasma-treating a surface of the film in a vacuum or normal pressure by using proper carrier and reaction gas so as to reform the surface may be included in order to increase surface energy for the purposes of increase in the impregnation rate of the organic electrolytes and enhancement of the bonding force between the coating layer and the polyolefin film.

An adhesive component for improving the bonding force with the coating layer may be coated on the polyolefin microporous film before coating the coating layer. A monomer, oligomer or polymer material may be used as an adhesive, and any material and process for improving the bonding force may be used with a range that the permeability described in the claims is not deteriorated.

Preferably, the polyolefin microporous film has a porosity of 30 to 60%, a thickness of 5 to 30 µm, and an average pore size of 0.01 to 0.5 µm. If the porosity or the thickness is too large, or if the average pore size is too small, it is not possible to secure a passage for ions, and thus a resistance in the battery may be increased. In reverse case, it is difficult to expect securing of stability against the electrical short. In order to secure the sufficient stability in the battery, preferably, the polyolefin microporous film has a gas permeability is $1.5 \times 10^{-5}$ to $20.0 \times 10^{-5}$ Darcy, a tensile strength of 500 to 3,000 $kg/cm^2$, a closing temperature of 120 to 140° C. and a meltdown temperature of 140 to 200° C.

The method of forming the thermally stable porous layer at high temperature on one surface or both surfaces of the polyolefin microporous film is classified into a pore forming method by phase-separation and a pore forming method by extraction. The pore forming method by phase-separation is divided into vapor induced phase-separation, thermally induced phase-separation and nonsolvent induced phase-separation. The present invention uses the nonsolvent induced phase-separation method in which a solution containing a nonsolvent and a solvent is coated on one surface or both surfaces of the polyolefin microporous film, and the phase-separation is carried out as the solvent is dried, and then the nonsolvent is dried or extracted so as to form a porous structure. The method includes the following processes.

The method of forming the thermally stable porous layer at high temperature on the polyolefin microporous film includes:

(1) preparing a mixed solution by mixing organic or inorganic particles and a nonsolvent of heat-resistant polymer with a solution in which the heat-resistant polymer is dissolved in a solvent;

(2) coating the mixed solution on one surface or both surfaces of a polyolefin microporous film;

(3) forming the thermally stable porous layer by drying and phase-separating the coated polyolefin microporous film; and (4) removing the solvent and nonsolvent remained in the thermally stable porous layer by drying or extracting.

The heat-resistant polymer of the layer has a melting temperature or a glass transition temperature of 170 to 500° C. and is not limited specially if it contains aromatic ring in main chain. Preferably, the heat-resistant polymer contains one or more of polyamide, polyimide, polyamideimide, polyethylene terephthalate, polycarbonate, polyarylate, polyetherimide, polyphenylene sulfone, polysulfone and so on. It is preferable to use polycarbonate or polyarylate which is relatively stable in the organic electrolytes.

A composition for the layer contains organic or inorganic particles which are selected according to various purposes of increase in the impregnation rate of the liquid electrolytes with respect to the separator, increase in the physical strength of the coating layer, increase in the porosity of the coating layer, increase in the heat resistance of the separator, and prevention of the electrical short by securing a space between electrodes upon an abnormal condition of the battery. The organic or inorganic particles are not limited particularly if they are stable electrochemically. The organic particles including one or more of polyvinyldene fluoride (PVdF), polytetrafluoroethylene (PTFE), polyurethane, polymethylpentene (PMP), polyethylene terephthalate (PET), polycarbonate (PC), polyester, polyvinyl alcohol (PVA), polyacrylonitrile (PAN), polymethylene oxide (PMO), polymethyl methacrylate (PMMA), polyethylene oxide (PEO), cellulose and so on, and the inorganic particles including one or more of an oxide, a hydroxide, a sulfide, a nitride, a carbide and the like of at least one of metallic or semiconductor elements such as Si, Al, Ca, Ti, B, Sn, Mg, Li, Co, Ni, Sr, Ce, Zr, Y, Pb, Zn, Ba, or alone or a mixture of the organic and inorganic particles may be used.

If necessary, some additives for particular purposes, such as antioxidant, UV stabilizer, and antistatic agent, may be added to the composition of the coating layer within a range that the characteristics of the separator are not deteriorated remarkably.

In order to enhance the heat resistance and strength of the polyolefin microporous film and also enhance the stability in the organic eletrolytes, the process of mixing monomer or oligomer having an unsaturated bonding group, and polymerizing and chemically cross-linking the mixture by using heat energy or ionizing radiation, or cross-linking the polyolefin alone or together with an initiator by using the ionizing radiation and the like may be included.

Concentrations of the organic or inorganic particle and the heat-resistant polymer, which form the final layer, in the solution to be coated on the polyolefin microporous film are not limited specially, if it is proper to show the characteristics of the above-mentioned microporous composite film. However, the concentration of the heat-resistant polymer is preferably 1 to 50 wt %, more preferably, 2 to 20 wt %. If the concentration of the heat-resistant polymer is less than 1 wt %, since it is difficult to form the coating layer having a sufficient thickness and uniform pores, it is not possible to enhance the thermal stability of the separator. If the concentration of the heat-resistant polymer is more than 50 wt %, since it is difficult to form the coating layer having a sufficient permeability, the performance of the battery is deteriorated due to increase of the resistance.

Further, the concentration of the organic or inorganic particle is preferably 1 to 50 wt %, more preferably, 2 to 20 wt %. If the concentration of the organic or inorganic particle is less than 1 wt %, it is difficult to achieve its purposes of increase in the impregnation rate of the liquid eletrolytes with respect to the separator, increase in the physical strength of the coating layer, increase in the porosity of the coating layer, increase in the heat resistance of the separator, and prevention of the electrical short by securing a space between electrodes upon an abnormal condition of the battery. If the concentration of the organic or inorganic particle is more than 50 wt %, the bonding force with the polyolefin microporous film is deteriorated due to relative reduction of the concentration of the heat-resistant polymer, and thus it is difficult to secure the heat resistance of the separator.

The heat-resistant polymer of the coating layer is dissolved in the organic solvent and then coated in the form of a solution. The organic solvent is not limited specially, if it can dissolve the heat-resistant polymer, and includes one or more of N,N-dimethylformamide (DMF), N-methyl-2-pyrrolidone (NMP), N,N-dimethylacetamide (DMAc), dimethylsulfoxide (DMSO), benzene, toluene, phenol, cresol, pyridine, chlorobenzene, dichlorobenzene, dioxane, dioxolane, acetone, methylethylketone (MEK), cyclohexanone, chloroform, tetrahydrofuran (THF), dichloroethane, dichloroethylene, trichloroethane, thrichloroethylene, dichloromethane, (MC), ethyl acetate and the like. In order to efficiently carry out the phase separation and increase the drying efficiency, it is preferable to use a solvent having a relatively high vapor pressure and thus having high volatility.

Moreover, the organic or inorganic particles are dispersed in the organic solvent. A higher polar solvent may be used in order to increase the dispersive ability of the particles. For example, the higher polar solvent may include water, alcohol, diol, ether, glycol, carbonate, ketone, phthalate and so on, and a mixture thereof.

The nonsolvent is not limited specially, if it can solidify the heat-resistant polymer of the coating layer and induce the phase separation. The nonsolvent includes water, alcohol, diol, hydrocarbon, ether, glycol, carbonate, ketone, phthalate, and a mixture thereof.

A content of the nonsolvent in the solution not limited specially, if it is proper to show the characteristics of the above-mentioned microporous composite film. However, the content of the nonsolvent is preferably 1 to 50 wt %, more preferably, 2 to 30 wt %. If the content of the nonsolvent is less than 1 wt %, it is not possible to form the coating layer having the sufficient permeability, and thus the performance of the battery is deteriorated due to increase of the resistance. If the content of the nonsolvent is more than 50 wt %, the pore size may be too large, or it is difficult to obtain the uniform pores, and thus it may exert an influence on the thermal stability of the separator. Further, it is preferable that the nonsolvent is selected from non-volatile liquids comparing with the solvent. This is caused by that the phase separation is carried out, as the concentration of the nonsolvent at the coated solution layer is increased by the drying.

A method of coating one surface or both surfaces or an internal portion of the polyolefin microporous film with the coating polymer solution prepared by above-mentioned method, which is not limited particularly, includes a bar coating method, a rod coating method, a die coating method, a comma coating method, a micro gravure/gravure method, a dip coating method, a spray method, a spin method and a mixed method thereof. After that, a process of removing a part of the coating layer using a doctor blade or an air knife.

During or after forming the coating layer on the polyolefin microporous film, a process of graft polymerizing polar monomer, oligomer or polymer by using the ionizing radiation so as to reform a surface of the film, or a process of plasma-treating a surface of the film in a vacuum or normal pressure by using proper carrier and reaction gas so as to reform the surface may be included in order to increase surface energy for the purposes of increase in the impregnation rate of the organic eletrolytes used when applied to the battery.

Advantageous Effects

As described above, since the microporous polyolefin composite film of the present invention contains the organic or inorganic particles, it has excellent permeability and high thermal stability at high temperature, and particularly, since it has excellent stability of the coating layer in high temperature organic electrolytes, it has a high meltdown temperature and a lower shrinkage at high temperature.

Further, the microporous polyolefin composite film of the present invention has excellent quality uniformity and wide application range, and thus it can show an excellent effect when applied to a high capacity/high power battery.

BRIEF DESCRIPTION OF DRAWINGS

The above and other objects, features and advantages of the present invention will become apparent from the following description of preferred embodiments given in conjunction with the accompanying drawings, in which.

BEST MODE FOR CARRYING OUT THE INVENTION

Hereinafter, the examples of the present invention will be described in detail with reference to accompanying drawings.

EXAMPLES

Characteristics of a microporous polyolefin composite film of the present invention are estimated by the following test method.

(1) Thickness of a film and coating layer

A contact type thickness measuring device having a precision of 0.1 μm with respect to a thickness is used, and values that three points or more in a TD and ten points or more in a MD are measured with respect to the microporous polyolefin composite film are used. A thickness of the coating layer is measured from a difference between a thickness of the microporous film before the coating and a thickness of the microporous film after the coating. In case of the microporous film of which both surfaces are coated with the coating layer, a half of the difference between the thickness before coating and thickness after the coating is used as the thickness of the microporous film.

(2) Porosity (%)

A porosity is calculated by the following equation 1 using a rectangular sample of Acm×Bcm. In all of the samples, A, B is within a range of 5 to 20 cm.

$$\text{Porosity} = [\{(A \times B \times T) - (M \div \rho) \div (A \times B \times T)\}] \times 100 \quad \text{[Equation 1]}$$

wherein $T$ = thickness (cm) of separator, $M$ = weight (g) of sample, and = a density (g/cm$^3$) of resin (3) Pore size and particle size A pore size is measured using a porometer (PMI company) in a half-dry method based on ASTM F316-03. An organic/inorganic particle size is measured from an apparent pore size calculated from a photograph of a scanning electron microscope with respect to the film surface.

(4) Gas permeability (Darcy)

A gas permeability is measured using a porometer (CFP-1500-AEL of PMI company). In general, the gas permeability is represented by a Gurley number, but since an influence by the film thickness is not compensated in the Gurley number, it is difficult to know a relative permeability according to a pore structure of the film. To solve the problem, the present invention uses Darcy's permeability constant. The Darcy's permeability constant is calculated from an equation 2, and nitrogen is used.

$$C = (8FTV)/(\pi D^2(P^2-1)) \quad \text{[Equation 2]}$$

wherein C=Darcy's permeability constant,
F=flow rate
T=thickness of sample
V=viscosity (0.185 for $N_2$) of gas
D=diameter of sample
P=pressure The present invention uses an average value of the Darcy's permeability constants in a range of 100 to 200 psi.

(5) Impregnation rate of electrolyte

After a test sample is kept at a room temperature and a relative humidity of 50%, the sample is cut into a size of 10×10 cm, and an initial weight (A) of the sample is measured. After the sample is digestedimmersed for 1 hour in the electrolyte, the microporous polyolefin composite film is taken out, and the electrolyte on the surface thereof is sufficiently removed with tissue paper, and then an impregnation rate is measured by measuring a weight (B) thereof. An average value with respect to at least five samples is used as the impregnation rate, and the impregnation rate is calculated by the following equation 3:

$$\% \text{ impregnation rate} = ((B-A/A) \times 100 \quad \text{[Equation 3]}$$

In the estimation of the impregnation rate, the electrolyte in which 1M lithium hexafluorophosphate ($LiPF_6$) is dissolved in a solution that ethylene carbonate and dimethyl carbonate are mixed in a weight ratio of 1:1 is used.

(6) Puncture strength (N/μm)

A puncture strength is measured using UTM (Universal Test Machine) 3345 fabricated by INSTRON company, when pressing the sample at a speed of 120 mm/min. At this time, a pin has a diameter of 1.0 mm, and a pin tip has a radius of curvature of 0.5 mm.

$$\text{Puncture strength } (N/\mu m) = \text{measuring load } (N) \text{ thickness } (\mu m) \text{ of separator} \quad \text{[Equation 4]}$$

(7) A tensile strength is measured in accordance with ASTM D882.

(8) For a bonding force, a 180° exfoliation bonding strength is measured on the basis of JIS K 6854-2. The bonding strength is measured using UTM (Universal Test Machine) 3345 fabricated by INSTRON company, when pulling the sample having a width of 25 mm at a speed of 100 mm/min. An average value of the bonding strength generated upon the exfoliation is used.

(9) A shrinkage is obtained by measuring MD and TD shrinkages in percent, after the microporous polyolefin composite film is kept for 60 minutes at a temperature of 150° C.

(10) Shutdown temperature and Meltdown temperature

Shutdown temperature and meltdown temperature of the microporous polyolefin composite film is measured in a simple cell which can measure impedance. In the simple cell, the microporous polyolefin composite film is interposed between two graphite electrodes, and electrolytes are injected.

An electrical resistance is measured, while temperature is increased from 25 to 200° C. at a rate of 5° C./min by using an alternating current of 1 kHz. At this time, a temperature in which the electrical resistance is rapidly increased to a few hundreds to a few thousands Ω or more is selected as the closing temperature, and a temperature in which the electrical resistance is again reduced to 100Ω or less is selected as the meltdown temperature. And the electrolyte in which 1M lithium hexafluorophosphate ($LiPF_6$) is dissolved in a solution that ethylene carbonate and propylene carbonate are mixed in a weight ratio of 1:1 is used.

(11) Hot box test

A battery is fabricated by using the microporous polyolefin composite film as the separator. After an anode in which $LiCoO_2$ is used as an active material and a cathode in which graphite carbon is used as an active material are wound together with the separator and then put into an aluminum pack, the electrolyte in which 1M lithium hexafluorophosphate ($LiPF_6$) is dissolved in a solution that ethylene carbonate and dimethyl carbonate are mixed in a weight ratio of 1:1 is injected therein, and then the aluminum pack is sealed, whereby a battery is assembled.

The assembled battery is put into an oven, and the temperature is increased to a temperature of 150° C. at a rate of 5° C./min, and then while the battery is left for 30 minutes, a change in the battery is observed and measured.

Example 1

In order to prepare the polyolefin microporous film, high density polyethylene having a weight average molecular weight of 3.8×10⁵ is used, and a mixture in which dibutyl phthalate and paraffin oil (kinematic viscosity at 40° C.: 160 cSt) is mixed at a rate of 1:2 is used as a diluent, and each content of the polyethylene and the diluent is 30 wt % and 70 wt %, respectively.

This composition is extruded at a temperature of 240° C. using a dual-axial compounder having a T-die, and passed through an area, of which temperature is set to 180° C., so as to induce a phase separation, and then a sheet is prepared using a casting roll. The sheet is prepared by a successive bi-axial stretching method in which a stretching rate is six times in each of a MD and a TD, and a stretching temperature is 121° C. Herein, a heat-setting temperature is 128° C., and a heat-setting width is 1-1.2-1.1. A final film has a thickness of 16 μm and a gas permeability of $3.5 \times 10^{-5}$ Darcy. A solution for forming the polymer coating layer is prepared by dissolving polycarbonate having a melting temperature of 231° C. in 1,4-dioxane solvent and then adding nonsolvent of ethylene glycol monobutyl ether (EGMBE) and silica ($SiO_2$, average particle size of 400 nm) which is surface-treated with 3-methacryloxypropyltrimethoxysilane (γ-MPS). In a composition of the solution, resin/particle/solvent/nonsolvent is 4/10/78/8 wt %. One surface is coated by the bar coating method, and then the film is dried in an oven of 60° C. for 30 minutes.

Example 2

The same the polyolefin microporous film as in the example 1 is used, and the solution for forming the polymer coating layer is prepared by dissolving polyarylate (PAR) having a glass transition temperature of 201° C. in THF solvent and also adding alumina ($Al_2O_3$, average particle size of 400 nm) and nonsolvent of pentanol. In the composition of the solution, resin/particle/solvent/nonsolvent is 4/8/82/6 wt %. One surface is coated by the bar coating method, and then the coated film is dried in an oven of 60° C. for 30 minutes.

Figure 1:
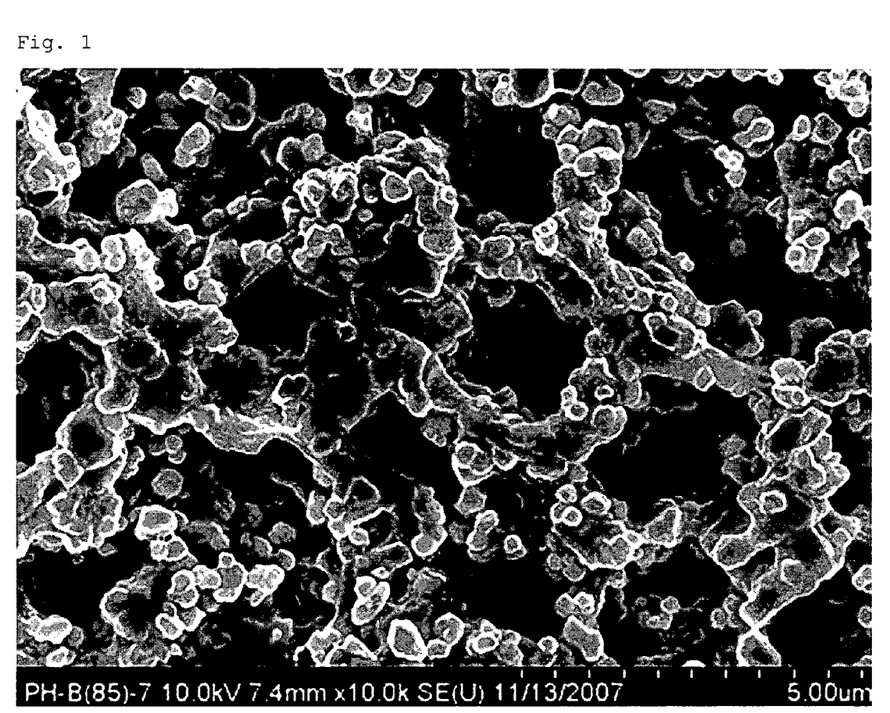
FIG. 1 is a photograph of a scanning electron microscope (10,000 magnifications) showing a surface of a microporous film according to a second example of the present invention.

A photograph of a scanning electron microscope showing a surface of the manufacture microporous polyolefin composite film is illustrated in FIG. 1.

Example 3

The same the polyolefin microporous film as in the example 1 is used, and the solution for forming the polymer coating layer is prepared by dissolving polycarbonate (PC) having a melting temperature of 231° C. in THF solvent and also adding nonsolvent of pentanol and silica ($SiO_2$, average particle size of 400 nm) which is surface-treated with 3-methacryloxypropyltrimethoxysilane (γ-MPS). In the composition of the solution, resin/particle/solvent/nonsolvent is 4/8/82/6 wt %. One surface is coated by the bar coating method, and then the coated film is dried in an oven of 60° C. for 30 minutes.

Example 4

The same the polyolefin microporous film as in the example 1 is used, and the solution for forming the polymer coating layer is prepared by dissolving and dispersing polysulfone (PSf) having a glass transition temperature of 189° C. and silica ($SiO_2$, average particle size of 400 nm) which is surface-treated with 3-methacryloxypropyltrimethoxysilane (γ-MPS) in THF solvent and then adding nonsolvent of n-butanol. In the composition of the solution, resin/particle/solvent/nonsolvent is 4/8/72/16 wt %. One surface is coated by the bar coating method, and then the coated film is dried in an oven of 60° C. for 30 minutes.

Example 5

The same the polyolefin microporous film as in the example 1 is used. Before forming the coating layer, plasma is discharged at atmospheric pressure for three seconds on the surface, on which the coating layer is formed, using nitrogen carrier gas and oxygen reaction gas. The solution for forming the polymer coating layer is prepared by dissolving polycarbonate (PC) having a melting temperature of 231° C. in THF solvent and also adding nonsolvent of pentanol and silica ($SiO_2$, average particle size of 400 nm) which is surface-treated with 3-methacryloxypropyltrimethoxysilane (γ-MPS). In the composition of the solution, resin/particle/solvent/nonsolvent is 4/8/78/10 wt %. One surface is coated by the bar coating method, and then the coated film is dried in an oven of 60° C. for 30 minutes.

Comparative Example 1

In order to prepare the polyolefin microporous film, high density polyethylene having a weight average molecular weight of 3.8×10⁵ is used, and a mixture in which dibutyl phthalate and paraffin oil (kinematic viscosity at 40° C.: 160 cSt) is mixed at a rate of 1:2 is used as a diluent, and each content of the polyethylene and the diluent is 30 wt % and 70 wt %, respectively.

This composition is extruded at a temperature of 240° C. using a dual-axial compounder having a T-die, and passed through an area, of which temperature is set to 180° C., so as to induce a phase separation, and then a sheet is prepared using a casting roll. The sheet is prepared by a successive bi-axial stretching method in which a stretching rate is six times in each of a machine direction (MD) and a transverse direction (TD), and a stretching temperature is 121° C. Herein, a heat-setting temperature is 128° C., and a heat-setting width is 1-1.2-1.1. A final film has a thickness of 16 μm and a gas permeability of $3.5 \times 10^{-5}$ Darcy, and the polymer coating layer is not coated.

Figure 2:
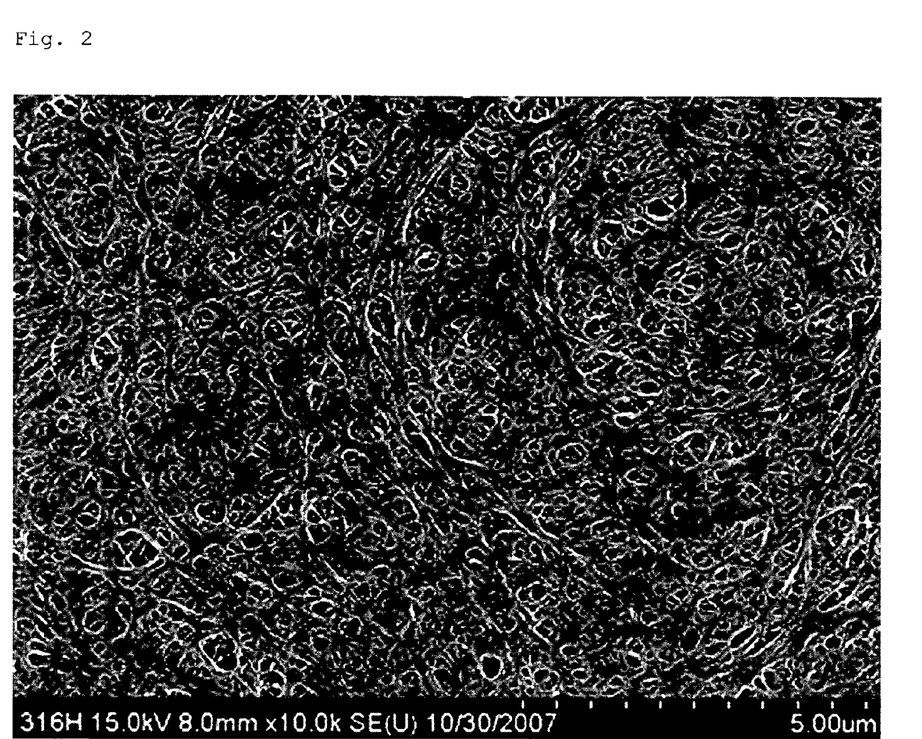
FIG. 2 is a photograph of a scanning electron microscope (10,000 magnifications) showing a surface of a microporous film according to a first comparative example.

A photograph of a scanning electron microscope showing a surface of the manufacture polyolefin microporous film is illustrated in FIG. 2.

Comparative Example 2

The same the polyolefin microporous film as in the comparative example 1 is used, and the solution for forming the polymer coating layer is prepared by dissolving polycarbonate (PC) having a melting temperature of 231° C. in THF solvent and also adding silica ($SiO_2$, average particle size of 400 nm) which is surface-treated with 3-methacryloxypropyltrimethoxysilane (γ-MPS), and the nonsolvent is not added. In the composition of the solution, resin/particle/solvent is 4/8/86 wt %. One surface is coated by the bar coating method, and then the coated film is dried in an oven of 60° C. for 30 minutes.

Comparative Example 3

The same the polyolefin microporous film as in the example 1 is used, and the solution for forming the polymer coating layer is prepared by dissolving polycarbonate (PC) having a melting temperature of 231° C. in THF solvent and also adding nonsolvent of pentanol, and the particles are not added. In the composition of the solution, resin/solvent/nonsolvent is 4/90/6 wt %. One surface is coated by the bar coating method, and then the coated film is dried in an oven of 60° C. for 30 minutes.

Figure 3:
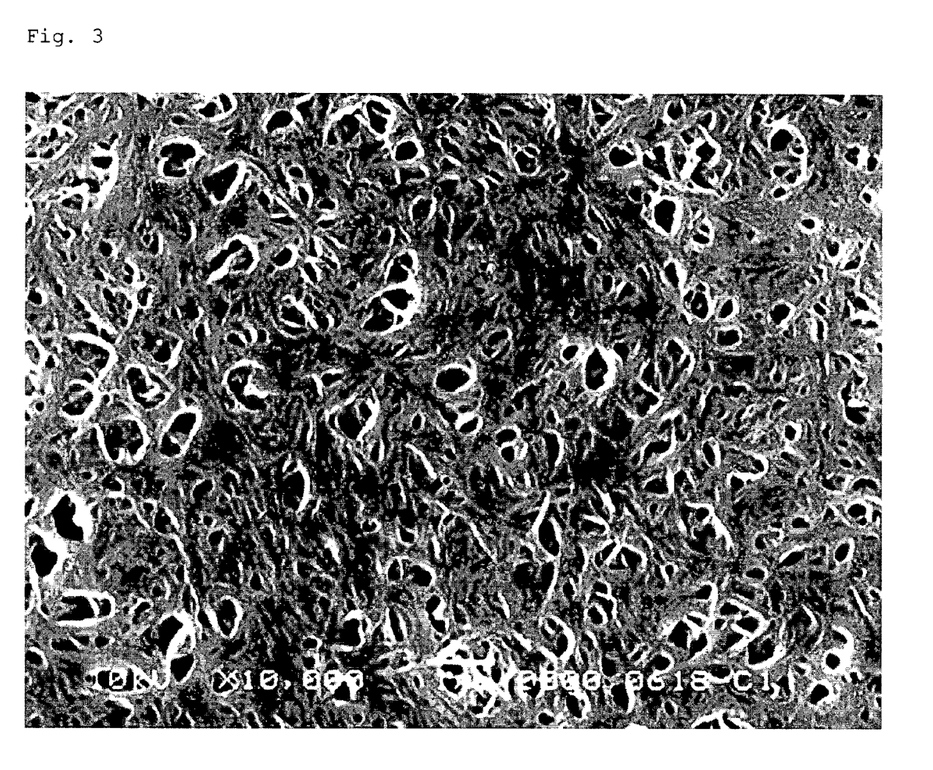
FIG. 3 a photograph of a scanning electron microscope (10,000 magnifications) showing a surface of a microporous film according to a third comparative example.

A photograph of a scanning electron microscope showing a surface of the manufacture microporous polyolefin composite film is illustrated in FIG. 3.

Comparative Example 4

The same the polyolefin microporous film as in the comparative example 1 is used, and the solution for forming the polymer coating layer is prepared by dissolving non-aromatic cellulose acetate having a glass transition temperature of 190° C. in acetone solvent and then adding alumina ($Al_2O_3$, average particle size of 400 nm) and nonsolvent of pentanol. In the composition of the solution, resin/particle/solvent/nonsolvent is 4/8/82/6 wt %. One surface is coated by the bar coating method, and then the coated film is dried in an oven of 60° C. for 30 minutes.

Comparative Example 5

The same the polyolefin microporous film as in the example 1 is used, and the solution for forming the polymer coating layer is prepared by dissolving polycarbonate (PC) having a melting temperature of 231° C. in THF solvent and also adding nonsolvent of n-butanol and silica ($SiO_2$, average particle size of 400 nm) which is surface-treated with 3-methacryloxypropyltrimethoxysilane (γ-MPS). In the composition of the solution, resin/particle/solvent/nonsolvent is 3.5/10/76.5/10 wt %. One surface is coated by the bar coating method, and then the coated film is dried in an oven of 70° C. for 20 minutes.

Testing conditions of the examples and the comparative examples and the results obtained therefrom are represented in table 1 and table 2.

TABLE 1

| | | unit | Example 1 | Example 2 | Example 3 | Example 4 | Example 5 |
|---|---|---|---|---|---|---|---|
| Polyolefin microporous film | | — | PE | PE | PE | PE | PE |
| Heat resistant treatment | Resin (concentration) | (%) | PC(4) + SiO$_2$(10) | PAR(4) + Al$_2$O$_3$(8) | PC(4) + SiO$_2$(8) | PSf(4) + SiO$_2$(8) | PC(3.5) + SiO$_2$(10) |
| | Solvent (concentration) | (%) | 1,4-dioxane(78) | THF(82) | THF(82) | THF(72) | THF(76.5) |
| | Nonsolvent (concentration) | (%) | EGMBE(8) | Pentanol(6) | Pentanol(6) | n-butanol(16) | Pentanol(10) |
| | Manufacturing | — | Phase separation (adding nonsolvent) | Phase separation (adding nonsolvent) | Phase separation (adding nonsolvent) | Phase separation (adding nonsolvent) | Plasma + phase separation (adding nonsolvent) |
| Thickness of Polyolefin microporous film | | μm | 16.1 | 16.0 | 16.0 | 16.0 | 16.1 |
| Thickness of coating layer | | μm | 4.5 | 5.5 | 5.0 | 5.2 | 5.2 |
| Bonding strength | | Kgf/cm | 0.22 | 0.28 | 0.25 | 0.23 | 0.31 |
| Puncture strength | | N/μm | 0.21 | 0.19 | 0.20 | 0.20 | 0.20 |
| Tensile strength | MD | Kgf/cm$^2$ | 992 | 932 | 978 | 953 | 972 |
| | TD | Kgf/cm$^2$ | 793 | 728 | 770 | 742 | 768 |
| Gas permeability | | 10$^{-5}$ Darcy | 1.9 | 2.2 | 2.1 | 2.0 | 2.2 |
| Organic/inorganic particle size | | μm | 0.4 | 0.4 | 0.08 | 0.4 | 0.4 |
| Impregnation rate of electrolyte | | % | 152 | 143 | 161 | 147 | 153 |
| Shrinkage, 150° C., 60 minutes | MD | % | 23 | 17 | 22 | 31 | 14 |
| | TD | % | 19 | 14 | 18 | 24 | 12 |
| Shutdown temperature | | ° C. | 136 | 135 | 135 | 136 | 136 |
| Meltdown temperature | | ° C. | 175 | >190 | 183 | >190 | >190 |
| Hot box (150° C., 30 minutes) | | — | Pass | Pass | Pass | Pass | Pass |

TABLE 2

| | | unit | Comparative example 1 | Comparative example 2 | Comparative example 3 | Comparative example 4 | Comparative example 5 |
|---|---|---|---|---|---|---|---|
| Polyolefin microporous film | | — | PE | PE | PE | PE | PE |
| Heat resistant treatment | Resin (concentration) | (%) | — | PC (4) + SiO$_2$(10) | PC(4) | Cellulose acetate(4) + Al$_2$O$_3$(8) | PC(3.5) + SiO$_2$(10) |
| | Solvent (concentration) | (%) | — | THF(86) | THF(90) | Acetone(82) | THF(76.5) |
| | Nonsolvent (concentration) | (%) | — | — | Pentanol(6) | Pentanol(6) | n-butanol(10) |
| | Manufacturing | — | — | — | Drying without nonsolvent | Phase separation (adding nonsolvent) | Phase separation (adding nonsolvent) | Phase separation (adding nonsolvent) |
| Thickness of Polyolefin microporous film | | μm | 16.0 | 15.9 | 16.0 | 16.9 | 16.0 |
| Thickness of coating layer | | μm | — | 4.8 | 5.5 | 4.3 | 5.2 |

TABLE 2-continued

|  | unit | Comparative example 1 | Comparative example 2 | Comparative example 3 | Comparative example 4 | Comparative example 5 |
|---|---|---|---|---|---|---|
| Bonding strength | Kgf/cm | — | 0.30 | 0.29 | 0.23 | 0.08 |
| Puncture strength | N/μm | 0.25 | 0.21 | 0.18 | 0.21 | 0.19 |
| Tensile strength MD | Kgf/cm$^2$ | 1308 | 1027 | 921 | 1010 | 934 |
| Tensile strength TD | Kgf/cm$^2$ | 1056 | 898 | 783 | 889 | 789 |
| Gas permeability | $10^{-5}$ Darcy | 3.5 | 0.3 | 1.3 | 2.3 | 2.9 |
| Organic/inorganic particle size | μm | — | 0.4 | — | 0.4 | 0.4 |
| Impregnation rate of electrolyte | % | 110 | 120 | 123 | 127 | 131 |
| Shrinkage, 150° C., 60 minutes MD | % | 70 | 16 | 18 | 34 | 52 |
| Shrinkage, 150° C., 60 minutes TD | % | 61 | 13 | 14 | 26 | 44 |
| Shutdown temperature | ° C. | 135 | 135 | 136 | 135 | 135 |
| Meltdown temperature | ° C. | 145 | >190 | 189 | 157 | 159 |
| Hot box (150° C., 30 minutes) | — | Fail | Pass | Pass | Fail | Fail |

Those skilled in the art will appreciate that the conceptions and specific embodiments disclosed in the foregoing description may be readily utilized as a basis for modifying or designing other embodiments for carrying out the same purposes of the present invention. Those skilled in the art will also appreciate that such equivalent embodiments do not depart from the spirit and scope of the invention as set forth in the appended claims.

Industrial Applicability

As described above, since the microporous polyolefin composite film of the present invention contains the organic or inorganic particles, it has excellent permeability and high thermal stability at high temperature, and particularly, since it has excellent stability of the coating layer in high temperature organic electrolyte, it has a high meltdown temperature and a lower shrinkage at high temperature.

Further, the microporous polyolefin composite film of the present invention has excellent quality uniformity and wide application range, and thus it can show an excellent effect when applied to a high capacity/high power battery.

The invention claimed is:

1. A microporous polyolefin composite film in which a thermally stable porous layer, which contains organic or inorganic particles and heat-resistant polymer having aromatic ring in main chain and also having a melting temperature or a glass transition temperature of 170 to 500° C., is formed on one surface or both surfaces of a polyolefin microporous film by a phase separation with a non-solvent, wherein the composite film with the porous layer has a permeability of 1.5× $10^{-5}$ to 20.0×$10^{-5}$ Darcy, a meltdown temperature of 160 to 300° C., a MD/TD shrinkage of 1 to 40% at a temperature of 150° C. for 60 minutes, wherein the heat-resistant polymer is selected from a group consisting of polycarbonate, polyacrylate, and a mixture thereof, the organic or inorganic particles have a size of 0.01 to 2 μm, the organic particles are selected from a group consisting of polyvinylidene fluoride (PVdF), polytetrafluoroethylene (PTFE), polyurethane, polymethylpentene (PMP), polyethylene terephthalate (PET), polycarbonate (PC), polyester, polyvinyl alcohol (PVA), polyacrylonitrile (PAN), polymethylene oxide (PMO), polymethyl methacrylate (PMMA), polyethylene oxide (PEO), cellulose, and a mixture thereof, and the inorganic particles are selected from a group consisting of an oxide, a hydroxide, a sulfide, a nitride, a carbide and a mixture thereof of at least one of metallic or semiconductor elements comprising Si, Al, Ca, Ti, B, Sn, Mg, Li, Co, Ni, Sr, Ce, Zr, Y, Pb, Zn, Ba, and the content of organic or inorganic particles is 2-20 wt % based on the solution coated on the polyolefin microporous film, the content of heat-resistant polymer is 2-20 wt % based on the solution coated on the polyolefin microporous film, and a remainder of the solution being a solvent and the non-solvent.

2. The microporous polyolefin composite film according to claim 1, wherein the thermally stable porous layer has a thickness which is 0.1 to 1.0 times that of the polyolefin microporous film, and a bonding force between the porous layer and the polyolefin microporous film is 0.1 to 1.0 kgf/cm.

3. The microporous polyolefin composite film according to claim 1, wherein the polyolefin microporous film is selected from a group consisting of polyethylene, polypropylene, polybutylene, a copolymer thereof, and a mixture thereof.

4. The microporous polyolefin composite film according to claim 1, wherein the surface of the polyolefin microporous film is treated by ionizing radiation or plasma.

5. A separator for a lithium secondary battery, comprising the microporous composite film according to claim 1.

6. A secondary battery comprising the separator according to claim 5.

* * * * *